US010417144B2

(12) United States Patent
Wang

(10) Patent No.: US 10,417,144 B2
(45) Date of Patent: Sep. 17, 2019

(54) BRIDGE DEVICE

(71) Applicant: VIA TECHNOLOGIES, INC., New Taipei (TW)

(72) Inventor: Tze-Shiang Wang, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 15/631,154

(22) Filed: Jun. 23, 2017

(65) Prior Publication Data

US 2018/0039584 A1 Feb. 8, 2018

Related U.S. Application Data

(60) Provisional application No. 62/371,305, filed on Aug. 5, 2016.

(30) Foreign Application Priority Data

Apr. 28, 2017 (TW) .............................. 106114239 A

(51) Int. Cl.
*G06F 13/10* (2006.01)
*G06F 13/40* (2006.01)
*G11B 33/12* (2006.01)

(52) U.S. Cl.
CPC .......... *G06F 13/102* (2013.01); *G06F 13/105* (2013.01); *G06F 13/4022* (2013.01); *G06F 13/4045* (2013.01); *G11B 33/126* (2013.01)

(58) Field of Classification Search
None
See application file for complete search history.

(56) References Cited

U.S. PATENT DOCUMENTS 9,904,338 B2   2/2018   Wu et al.
2010/0149713 A1   6/2010   So
(Continued)

FOREIGN PATENT DOCUMENTS

CN        1307285 A     8/2001
CN      102834817 A    12/2012
(Continued)

OTHER PUBLICATIONS

Chinese language office action dated Dec. 27, 2017, issued in application No. TW 106114239.
(Continued)

*Primary Examiner* — Henry Tsai
*Assistant Examiner* — Aurangzeb Hassan
(74) *Attorney, Agent, or Firm* — McClure, Qualey & Rodack, LLP

(57) ABSTRACT

A bridge device including a first connector, a first transceiver, a second connector, a second transceiver, a voltage processor, and a controller is provided. The first connector is configured to couple to a host and includes a first pin. The first transceiver is coupled between the first pin and a node and includes a first current limiter. The second connector is configured to couple to a peripheral device and includes a second pin. The second transceiver is coupled between the node and the second pin and includes a second current limiter. The voltage processor processes the voltage of the node to generate an operation voltage. The controller receives the operation voltage to determine whether to turn on at least one of the first and second transceivers.

24 Claims, 11 Drawing Sheets

(56) References Cited

U.S. PATENT DOCUMENTS

| | | | |
|---|---|---|---|
| 2011/0239008 A1 | 9/2011 | Lam et al. | |
| 2013/0151749 A1* | 6/2013 | Lai | G06F 13/4068 710/313 |
| 2015/0214734 A1 | 7/2015 | Wu et al. | |
| 2016/0285757 A1* | 9/2016 | Srivastava | H04L 12/10 |
| 2017/0139434 A1* | 5/2017 | Wagner | G05B 15/02 |
| 2017/0222463 A1* | 8/2017 | Pullen | H02J 7/0072 |
| 2017/0344512 A1* | 11/2017 | Jen | G06F 13/4068 |
| 2018/0060261 A1* | 3/2018 | Chhor | G06F 13/4282 |

FOREIGN PATENT DOCUMENTS

| | | |
|---|---|---|
| CN | 104809088 A | 7/2015 |
| TW | 201530319 A | 8/2015 |
| TW | I518515 B | 1/2016 |
| TW | M526106 U | 7/2016 |
| TW | 201644145 A | 12/2016 |

OTHER PUBLICATIONS

Chinese Office Action dated Mar. 15, 2019, issued in application CN 201710337834.5.

\* cited by examiner

| Connection state | Mode | Power Supply | Transceiver 206 | Transceiver 208 |
|---|---|---|---|---|
| Host | M21 | Host | ON | OFF |
| Device | M22 | Device | OFF | ON |
| Host+ Device | M23 | Device | ON | ON |
| Host+ Device | M24 | Host | ON | ON |

FIG. 2B

| Connection state | Mode | Power Supply | Transceiver 306 | Transceiver 308 | Transceiver 320 |
|---|---|---|---|---|---|
| Host | M31 | Host | ON | OFF | OFF |
| Device | M32 | Device | OFF | ON | OFF |
| Host+ Device | M33 | Device | ON | ON | OFF |
| Host+ Device | M34 | Host | ON | ON | OFF |
| Host+ Device | M35 | Device | OFF | ON | ON |

FIG. 3B

| Connection state | Mode | Power Supply | Transceiver 406 | Transceiver 408 | Transceiver 420 | Voltage regulator 418 |
|---|---|---|---|---|---|---|
| Host | M41 | Host | ON | OFF | OFF | Deactivate |
| Device | M42 | Device | OFF | ON | OFF | Deactivate |
| Host + Device | M43 | Device | ON | ON | OFF | Deactivate |
| Host + Device | M44 | Host | ON | ON | OFF | Deactivate |
| Host + Adapter | M45 | Adapter | ON | OFF | ON | Activate |
| Host + Device + Adapter | M46 | Device + Adapter | ON | ON | ON | Activate |
| Host + Device + Adapter | M47 | Adapter | OFF | ON | ON | Activate |
| Host + Device + Adapter | M48 | Adapter | ON | ON | ON | Activate |
| Host + Device + Adapter | M49 | Host + Adapter | ON | ON | ON | Activate |

FIG. 4B

| Connection state | Mode | Power Supply | Transceiver 606 | Transceiver 608 | Transceiver 622 | Voltage regulator 618 | Voltage regulator 620 |
|---|---|---|---|---|---|---|---|
| Host | M61 | Host | ON | OFF | OFF | Deactivate | Deactivate |
| Device | M62 | Device | OFF | ON | OFF | Deactivate | Deactivate |
| Host + Device | M63 | Device | ON | ON | OFF | Deactivate | Deactivate |
| Host + Device | M64 | Host | ON | ON | OFF | Deactivate | Deactivate |
| Host + Adapter | M65 | Adapter | ON | OFF | ON | Activate | Deactivate |
| Host + Adapter | M66 | Adapter | OFF | OFF | ON | Deactivate | Deactivate |
| Host + Device + Adapter | M67 | Device + Adapter | ON | ON | ON | Deactivate | Deactivate |
| Host + Device + Adapter | M68 | Adapter | ON | ON | ON | Activate | Deactivate |
| Host + Device + Adapter | M69 | Adapter | OFF | OFF | ON | Deactivate | Activate |
| Host + Device + Adapter | M70 | Adapter | OFF | OFF | ON | Deactivate | Activate |
| Host + Device + Adapter | M71 | Adapter | ON | OFF | ON | Deactivate | Activate |

FIG. 6B

BRIDGE DEVICE

CROSS REFERENCE TO RELATED APPLICATIONS

This application claims the benefit of U.S. Provisional Application No. 62/371,305 filed on Aug. 5, 2016, which is hereby incorporated by reference in its entirety.

This Application claims priority of Taiwan Patent Application No. 106114239, filed on Apr. 28, 2017, the entirety of which is incorporated by reference herein.

BACKGROUND OF THE INVENTION

Field of the Invention

The invention relates to a bridge device, and more particularly to a bridge device coupled between a host and a peripheral device.

Description of the Related Art

With technological development, the thicknesses and overall size of electronic devices have been reduced. The number of connectors disposed on electronic devices has also been reduced. Take the present smart phone as an example: only one USB connector is disposed on a smart phone. When a charger is coupled to the smart phone via the USB connector, the charger charges the smart phone. When a peripheral device is coupled to the smart phone, the smart phone communicates with the peripheral device. However, the smart phone cannot simultaneously be coupled to both the charger and the peripheral device. Therefore, when the smart phone performs a charge operation, the smart phone cannot communicate with a peripheral device.

BRIEF SUMMARY OF THE INVENTION

In accordance with an embodiment, a bridge device includes a first connector, a first transceiver, a second connector, a second transceiver, a voltage processor, and a controller. The first connector is configured to couple to a host and includes a first pin. The first transceiver is coupled between the first pin and a node and includes a first current limiter. The second connector is configured to couple to a peripheral device and includes a second pin. The second transceiver is coupled between the node and the second pin and includes a second current limiter. The voltage processor processes a voltage of the node to generate an operation voltage. The controller receives the operation voltage to determine whether to turn on at least one of the first and second transceivers.

BRIEF DESCRIPTION OF THE DRAWINGS

The invention can be more fully understood by referring to the following detailed description and examples with references made to the accompanying drawings, wherein:

FIG. 2B is a schematic diagram of an exemplary embodiment of operation modes of the bridge device shown in FIG. 2A, according to various aspects of the present disclosure;

FIG. 3B is a schematic diagram of an exemplary embodiment of operation modes of the bridge device shown in FIG. 3A, according to various aspects of the present disclosure;

FIG. 4B is a schematic diagram of an exemplary embodiment of operation modes of the bridge device shown in FIG. 4A, according to various aspects of the present disclosure:

FIG. 6B is a schematic diagram of an exemplary embodiment of operation modes of the bridge device shown in FIG. 6A, according to various aspects of the present disclosure.

DETAILED DESCRIPTION OF THE INVENTION

Figure 1A:
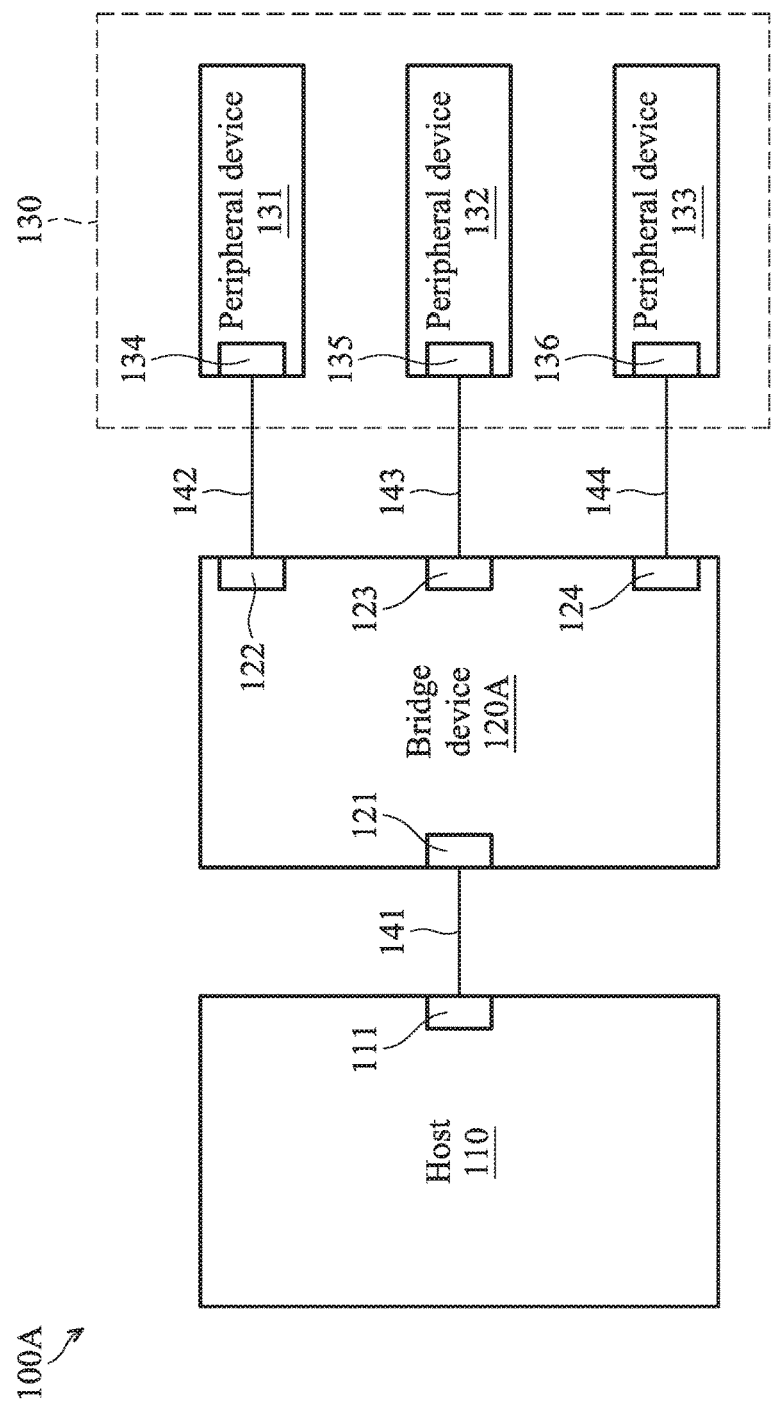
FIG. 1A is a schematic diagram of an exemplary embodiment of an operation system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1A is a schematic diagram of an exemplary embodiment of an operation system, according to various aspects of the present disclosure. The operation system 100A includes a host 110, a bridge device 120A, and a peripheral module 130. The invention does not limit the type of host 110. In one embodiment, the host 110 is a computer or a smart phone. The host 110 includes a connector 111 to transmit data and/or power. In one embodiment, the connector 111 is a USB Type-C connector. The host 110 utilizes the power pin (e.g. VBUS) of the USB Type-C connector to receive or output power and utilizes the data pins (e.g. Tx1+, Tx1−, Rx1−, Tx2+, Tx2−, Rx2+, Rx2−, D+, and D−) of the USB Type-C connector to receive or output data.

The bridge device 120A is coupled between the host 110 and the peripheral module 130 to transmit data and power between the host 110 and the peripheral module 130. As shown in FIG. 1A, the bridge device 120A includes a connector 121. In one embodiment, the connector 121 is directly inserted into the connector 111. In this case, the cable 141 can be omitted. In another embodiment, the connector 121 is coupled to the connector 111 via the cable 141. In other embodiments, the connector 121 is a USB Type-C connector.

The bridge device 120A further includes connectors 122~124 to couple to the peripheral module 130. In this embodiment, the peripheral module 130 includes peripheral devices 131~133, but the disclosure is not limited thereto. In other embodiments, the peripheral module 130 includes more peripheral devices or fewer peripheral devices. The invention does not limit the type of peripheral devices 131~133. In one embodiment, one of the peripheral devices 131~133 is a storage device, a display device or a charger.

The bridge device 120A determines the operation mode of the host 110 according to the connection states of the connectors 121-124 and the capabilities of the host 110 and the peripheral devices 131~133. For example, if the peripheral device 131 is not a charger, the bridge device 120A outputs a host power provided by the host 110 to the peripheral device 131. At this time, the host 110 provides power to the bridge device 120A. If the peripheral device 131 is a chortler, the bridge device 120A outputs charge power provided by the peripheral device 131 to the host 110. At this time, the peripheral device 131 provides power to the bridge device 120A.

In this embodiment, when the peripheral devices 131~133 are coupled to the bridge device 120A the host 110 may receive charge power provided by one of the peripheral devices 131~133, and simultaneously, the host 110 may output data to another of the peripheral devices 131~133. For example, assume that the peripheral device 131 is a Charger and the peripheral device 132 is a display device. In such cases, the host 110 receives charge power provided by the peripheral device 131, and simultaneously, the host 110 outputs image signals to the peripheral device 132 via the bridge device 120A. Therefore, when the host 110 is charged, the peripheral device 132 displays a corresponding image. In another embodiment, the bridge device 120 may transmit charge power provided by the peripheral device 131 to the peripheral device 132.

As shown in FIG. 1A, the connector 122 is coupled to the connector 134 of the peripheral device 131 via the cable 142, the connector 123 is coupled to the connector 135 of the peripheral device 132 via the cable 143, and the connector 124 is coupled to the connector 136 of the peripheral device 133 via the cable 144. The invention does not limit the type of connectors 122~124. In one embodiment, at least one of the connectors 122~124 is a USB connector, a high definition multimedia interface (HDMI) connector, a video graphics array (VGA) connector, or a power socket. In other embodiments, at least one of the peripheral devices 131~133 inserts the corresponding connector. In this case, the corresponding cable is coupled between the corresponding peripheral device and the corresponding connector.

Figure 1B:
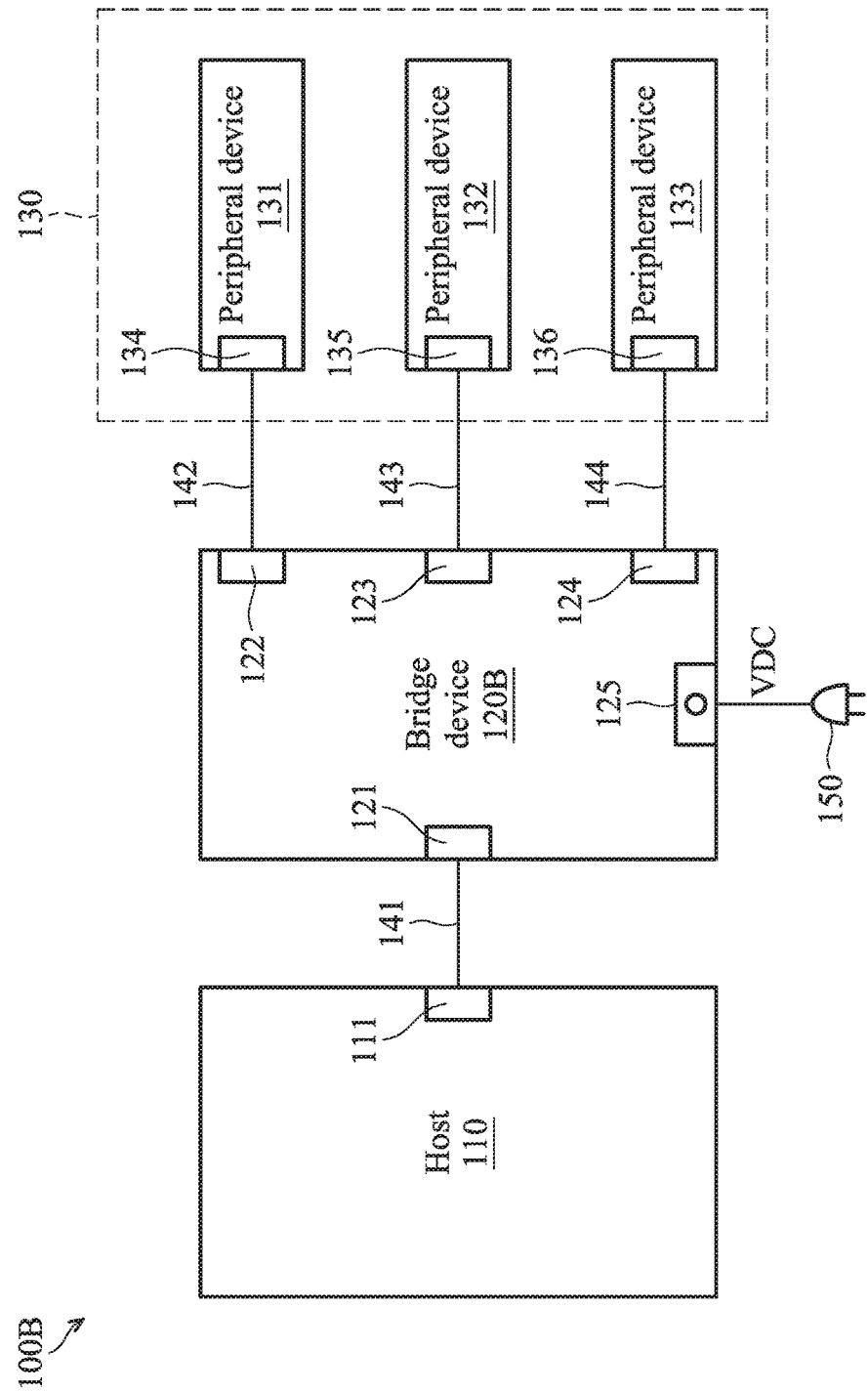
FIG. 1B is a schematic diagram of another exemplary embodiment of the operation, according to various aspects of the present disclosure.

FIG. 1B is a schematic diagram of another exemplary embodiment of the operation, according to various aspects of the present disclosure. FIG. 1B is similar to FIG. 1A with the exception that the bridge device 120B further includes a power socket 125. In this embodiment, when an adapter 150 is inserted into the power socket 125, the bridge device 120B transmits external power VDC provided by the adapter 150 to the host 110 to charge the host 110. When the host 110 is charged, the host 110 continuously communicates with at least one of the peripheral devices 131~133. Furthermore, the bridge device 120B is capable of providing the external power VDC to at least one of the peripheral devices 131~133.

In one embodiment, when each of the peripheral devices 131~133 is not a charger, the external power VDC is referred to as main power and provided to the host 110 and the bridge device 120B. In another embodiment, the bridge device 120B can provide the external power VDC to at least one of the peripheral devices 131~133. In other embodiments, when one of the peripheral devices 131~133 is a charger, the bridge device 120B determines whether to use the external power VDC according to the capabilities of the charger. Assume that the peripheral device 131 is a charger. In this case, when the power energy provided by the peripheral device 131 is less than the power energy required by the host 110, the bridge device 120B may not use the charge power provided by the peripheral device 131 instead only use the external power VDC, or may use the charge power provided by the peripheral device 131 and the external power VDC. A more detailed description follows.

Figure 2A:
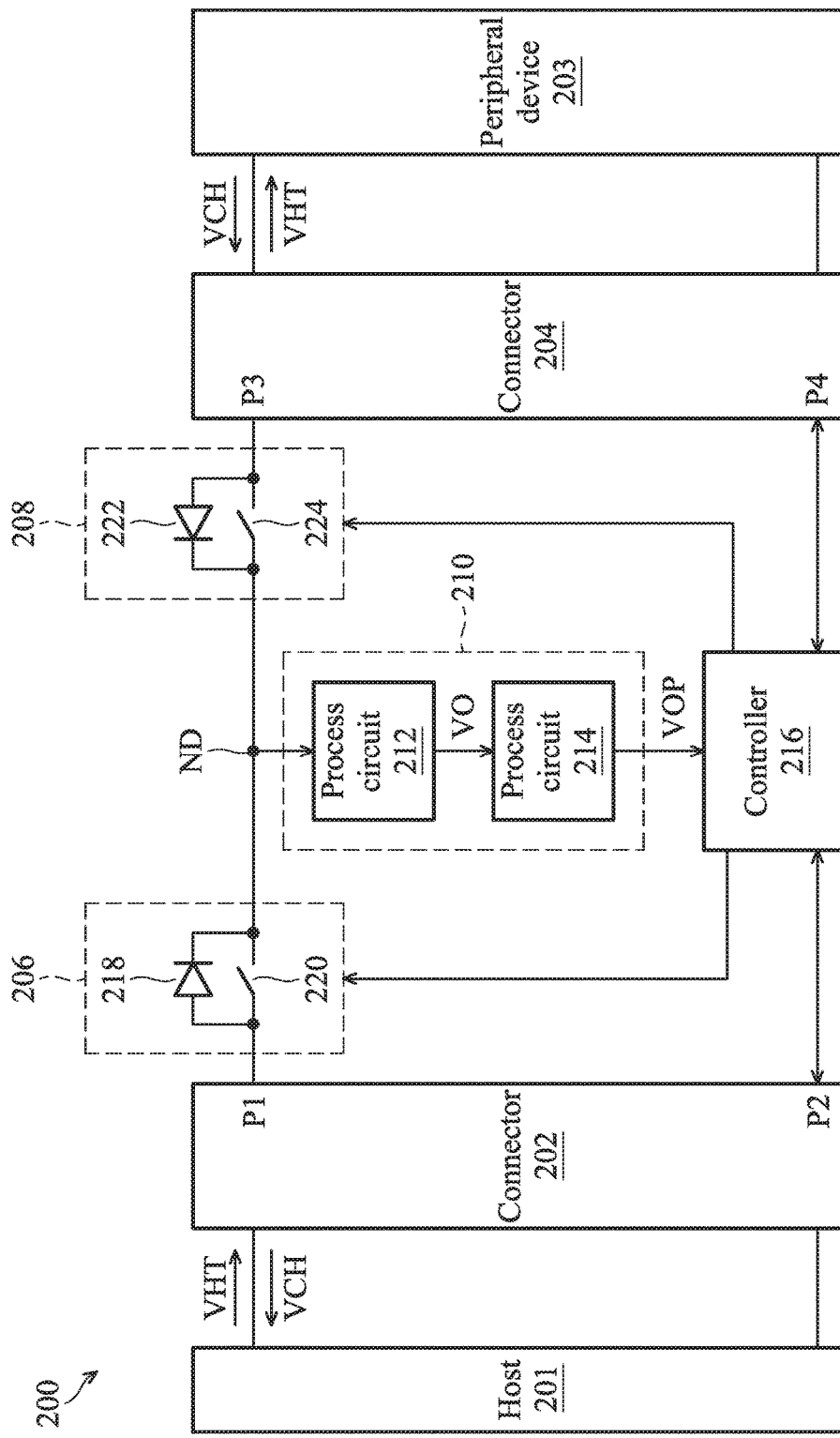
FIG. 2A is a schematic diagram of an exemplary embodiment of a bridge device, according to various aspects of the present disclosure.

FIG. 2A is a schematic diagram of an exemplary embodiment of a bridge device, according to various aspects of the present disclosure. The bridge device 200 includes connectors 202 and 204, transceivers 206 and 208, a voltage processor 210, and a controller 216. The connector 202 is configured to couple a host 201. The connector 204 is configured to couple to a peripheral device 203. In other embodiments, the bridge device 200 includes more connectors configured to couple to many peripheral devices.

The connector 202 at least includes pins P1 and P2. The pin P1 serves as a power pin to receive a host power VHT provided by the host 201 or provide charge power VCH to the host 201. The pin P2 serves as a communication pin. The controller 216 can communicate with the host 201 via the pin P2. In one embodiment, when the connector 202 is a USB Type-C connector, the power pin VBUS of the USB Type-C connector can serve as the pin P1 and the configuration channel (CC) pin of the USB Type-C connector can serve as the pin P2.

The transceiver 206 is coupled between the connector 202 and a node ND and includes a current limiter 218 and a switch 220. When the host 201 provides a host power VHT to the pin P1, the current limiter 218 processes the host power VHT to generate a first output voltage to the node ND. In this embodiment, the current limiter 218 is a diode. The current limiter 218 reduces the host power VHT to generate the first output voltage to the node ND.

When the switch 220 is turned on, since the impedance of the switch 220 is less than that of the current limiter 218, the host power VHT is transmitted to the node ND via the switch 220. In another embodiment, when the switch 220 is turned on, the switch 220 transmits the voltage of the node ND to the pin P1. In one embodiment, the transceiver 206 is a P-type transistor. The body diode of the P-type transistor can serve as the current limiter 218. In another embodiment, the transceiver 206 is an N-type transistor.

The connector 204 comprises pins P3 and P4. The pin P3 serves as a power pin to transmit the host power VHT or the charge power VCH. The pin P4 serves as a communication pin. In this embodiment, the controller 216 communicates with the peripheral device 203 via the pin P4. In one embodiment, when the connector 204 is an USB Type-C connector, the power pin (VBUS) of the USB Type-C connector can serve as the pin P3 and the configuration channel (CC) pin of the USB Type-C connector can serve as the pin P4.

The transceiver 208 is coupled between the node ND and the connector 204 and includes a current limiter 222 and a switch 224. When the peripheral device 203 provides charge power VCH to the pin P3, the current limiter 222 decreases the charge power VCH to generate a second output voltage to the node ND. When the switch 224 is turned on, since the impedance of the switch 224 is less than the impedance of the current limiter 222, the charge power VCH passes through the switch 224 to the node ND. In another embodiment, when the switch 224 is turned on, the voltage of the node ND passes through the switch 224 and is transmitted to the pin P3. In other embodiments, the transceiver 208 is a P-type transistor or an N-type transistor.

The voltage processor 210 processes the voltage of the node ND to generate an operation voltage VOP. The voltage processor 210 includes process circuits 212 and 214. In one embodiment, the process circuit 212 is a boost circuit, and the process circuit 214 is a buck circuit. In such cases, the process circuit 212 increases the voltage level of the node ND to generate an output voltage VO. The process circuit 214 reduces the output voltage VO to generate the operation voltage VOP. In another embodiment, the process circuit 212 is a buck circuit to reduce the voltage level of the node ND and generate an output voltage VO. In this case, the process circuit 214 is a boost circuit to increase the output voltage VO to generate the operation voltage VOP.

When the controller 216 receives the operation voltage VOP, the controller 216 starts operating. In this embodiment, the controller 216 determines the connection states of the connectors 202 and 204 and the capabilities of the host 201 and the peripheral device 203 to turn on at least one of the transceivers 206 and 208. The operating principle of the controller 216 is described below.

In another embodiment, when the bridge device 200 includes many connectors to couple to many peripheral devices, the controller 216 also transmits data and/or power between the host 201 and the peripheral devices. In this embodiment, since the bridge device 200 includes the current limiters 218 and 222, even if the switches 220 and 224 are turned off, the node ND receives voltage. Therefore, the voltage processor 210 is capable of generating the operation voltage VOP to trigger the controller 216. After the controller 216 is triggered, the controller 216 turns on at least one of the switches 220 and 224 according to the connection states of the connectors 202 and 204 and the capabilities of the host 201 and the peripheral device 203. When at least one of the switches 220 and 224 is turned on, the voltage processor 210 can generate an operation voltage with more energy to the controller 216 such that the controller 216 serves as a bridge device between the peripheral devices and the host 201.

FIG. 2B is a schematic diagram of an exemplary embodiment of operation modes of the bridge device 200 shown in FIG. 2A, according to various aspects of the present disclosure. When the host 201 provides the host power VHT to the pin P1, the current limiter 218 decreases the host power VHT to generate a first output voltage to the node ND. The voltage processor 210 processes the voltage level of the node ND to generate an operation voltage VOP and provides the operation voltage VOP to trigger the controller 216. When the controller 216 is triggered, the controller 216 determines the connection states of the connectors 202 and 204. Since only the host 201 is coupled to the bridge device 200, the bridge device 200 operates in a mode M21. In this mode, the controller 216 turns on the transceiver 206 and turns off the transceiver 208. Therefore, the transceiver 206 provides the host power VHT to the node ND. At this time, the host 201 provides power to the bridge device 200.

When the peripheral device 203 provides charge power VCH to the pin P3, the current limiter 222 reduces the charge power VCH to generate a second output voltage to the node ND. The voltage processor 210 processes the voltage level of the node ND to generate an operation voltage VOP to the controller 216. The controller 216 determines the connection states of the connectors 202 and 204. Since only the peripheral device 203 is coupled to the bridge device 200, the bridge device 200 operates in a mode M22. In this mode, the controller 216 turns on the transceiver 208 and turns off the transceiver 206. At this time, the transceiver 208 provides the charge power VCH to the node ND. Therefore, the power of the bridge device 200 is provided from the peripheral device 203.

When the host 201 is coupled to the connector 202 and the peripheral device 203 is coupled to the connector 204, the controller 216 determines the capabilities of the host 201 and the peripheral device 203. If the peripheral device 203 is a charger, the bridge device 200 operates in a mode M23. In the mode M23, the controller 216 first turns on the transceiver 208 and communicates with the peripheral device 203 via the pin P4 to determine the capabilities of the peripheral device 203, for example the type of charge energy provided by the peripheral device 203. The controller 216 informs the host 201 of the obtained result via the pin P2. The host responds with which power energy is needed. The controller 216 directs the peripheral device 203 to provide applicable power energy according to the response provided by the host 201. After the peripheral device 203 outputs the applicable charge power, the controller 216 turns on the transceiver 206 to charge the host 201. In this case, the transceivers 206 and 208 are turned on and the power of the bridge device 200 is provided by the peripheral device 203. In some embodiments, the bridge device 200 provides the charge power provided by the peripheral device 203 to the host 201 and further provided the charge power provided to other peripheral devices. In other words, the charge power provided by the peripheral device 203 is higher than the power required by the host 201.

However, when the host 201 and the peripheral device 203 are coupled to the bridge device 200 and the peripheral device 203 is not a charger, the bridge device 200 operates in a mode M24. In this mode, the controller 216 turns on the transceivers 206 and 208 to transmit the host power VHT to the peripheral device 2013. At this time, the host 201 provides power to the bridge device 200 and the peripheral device 203. In other embodiments, if the peripheral device 203 does not need to be charged, the bridge device 200 turns off the transceiver 208.

The invention does not limit the circuit structure of the controller 216. Any circuit can serve as the controller 216, as long as the circuit is capable of communicating with the host 201 and the peripheral device 203. In one embodiment, the controller 216 at least includes a micro-control unit (MCU), an analog-to-digital convener (ADC), a power delivery controller, a general purpose input output (GPIO) circuit, an inter-integrated circuit (I2C) controller, and an image processor.

Figure 3A:
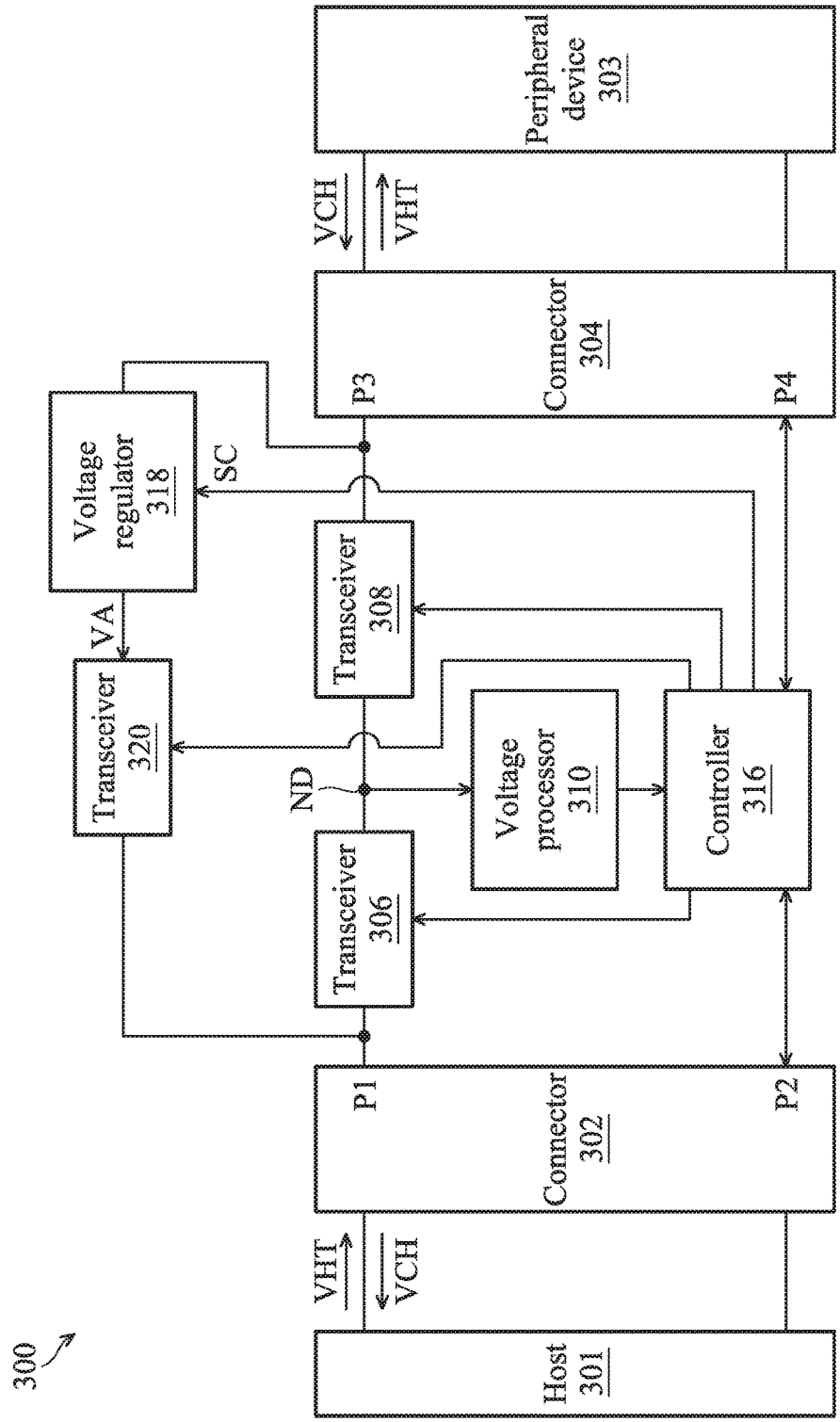
FIG. 3A is a schematic diagram of another exemplary embodiment of the bridge device, according to various aspects of the present disclosure.

FIG. 3A is a schematic diagram of another exemplary embodiment of the bridge device, according to various aspects of the present disclosure. FIG. 3A is similar to FIG. 2A with the exception that the bridge device 300 shown in FIG. 3A further includes a voltage regulator 318 and a transceiver 320. The operation of the connector 302 is the same as the operation of the connector 202. The operation of the connector 304 is the same as the operation of the connector 204. The operation of the transceiver 306 is the same as the operation of the transceiver 206. The operation of the transceiver 308 is the same as the operation of the transceiver 208. The operation of the voltage processor 310 is the same as the operation of the voltage processor 210. Therefore, the descriptions of the connectors 302 and 304, the transceivers 306 and 308, and the voltage processor 310 are omitted.

The voltage regulator 318 transforms the level of the pin P3 according to a control signal SC to generate an adjustment voltage VA. In this embodiment, the control signal SC is generated by the controller 316. In one embodiment, the controller 316 generates the control signal SC according to an I2C protocol, but the disclosure is not limited thereto. In other embodiments, the controller 316 activates and controls the voltage regulator 318 according to other communication protocols.

The transceiver 320 is coupled between the pin P1 and the voltage regulator 318. In one embodiment, the transceiver 320 is a switch element to transmit the adjustment voltage VA to the pin P1. In this embodiment, the transceiver 320 is controlled by the controller 316. In other embodiments, the transceiver 320 is a P-type transistor or an N-type transistor.

FIG. 3B is a schematic diagram of an exemplary embodiment of operation modes of the bridge device 300 shown in FIG. 3A, according to various aspects of the present disclosure. In this embodiment, the bridge device 300 may operate in one of the modes M31~M35. The feature of the mode M31 is the same as the feature of the mode M21. The feature of the mode M32 is the same as the feature of the mode M22. The feature of the mode M33 is the same as the feature of the mode M23. The feature of the mode M34 is the same as the feature of the mode M24. Therefore, the descriptions of the modes M31~M34 are omitted. Furthermore, when the bridge device 300 operates in one of the modes M31~M34, the controller 316 deactivates the voltage regulator 318 and turns off the transceiver 320.

When the host 301 and the peripheral device 303 are coupled to the bridge device 300, the controller 316 determines what type of charge energy provided by the peripheral device 303 and what type of charge energy required by host 301. When the charge energy provided by the peripheral device 303 is higher than the charge energy required by the host 301, the bridge device 300 operates in the mode M35. In this mode, the controller 316 generates the control signal SC to activate the voltage regulator 318 such that the charge energy provided by the peripheral device 303 is transformed into the charge energy required by the host 301 and then turns on the transceiver 320 to provide power to the host 301. At this time, the controller 316 turns off the transceiver 306 to avoid more power entering the host 301. In the mode M35, the controller 316 turns on the transceiver 308 to provide power to the bridge device 300. In one embodiment, the peripheral device 303 is a charger and the bridge device 300 is further coupled to a peripheral device, such as a hard disc (not shown). In this case, the peripheral device 303 provides the charge energy enough to charge the host 110, and the bridge device 300 provides the remaining charge energy, which is equivalent to the charge energy provided by the peripheral device 303 minus the charge energy required by the host 301, to supply the operation of the hard disc. In other words, the charge energy provided by the peripheral device 303 is higher than the charge energy required by the host 301.

Figure 4A:
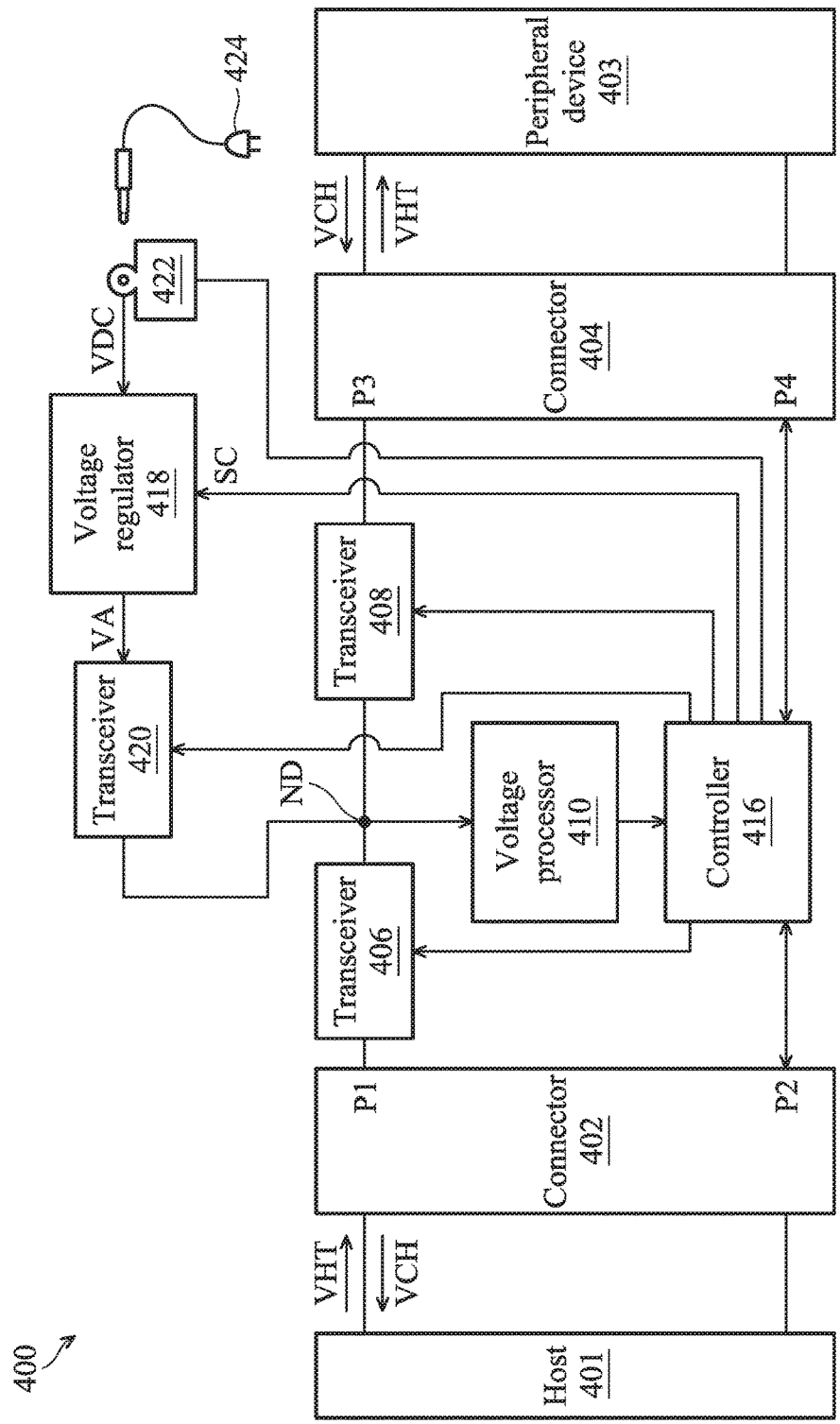
FIG. 4A is a schematic diagram of another exemplary embodiment of the bridge device, according to various aspects of the present disclosure.

FIG. 4A is a schematic diagram of another exemplary embodiment of the bridge device, according to various aspects of the present disclosure. FIG. 4A is similar to FIG. 2A with the exception that the bridge device 400 shown in FIG. 4A further includes a voltage regulator 418, a transceiver 420, and a power socket 422. The operation of the connector 402 shown in FIG. 4A is the same as the operation of the connector 202 shown in FIG. 2A. The operation of the connector 404 shown in FIG. 4A is the same as the operation of the connector 204 shown in FIG. 2A. The operation of the voltage processor 410 shown in FIG. 4A is the same as the operation of the voltage processor 210 shown in FIG. 2A. The operation of the transceiver 406 shown in FIG. 4A is the same as the operation of the transceiver 206 shown in FIG. 2A. The operation of the transceiver 408 shown in FIG. 4A is the same as the operation of the transceiver 208 shown in FIG. 2A. Therefore, the descriptions of the connectors 402 and 404, the voltage processor 410, and the transceivers 406 and 408 are omitted.

The power socket 422 is configured to couple to an adapter 424. The adapter 424 provides external power VDC. The voltage regulator 418 transforms the external power VDC according to a control signal SC to generate an adjustment voltage VA. The transceiver 420 is coupled between the node ND and the voltage regulator 418 and controlled by the controller 416. When the controller 416 turns on the transceiver 420, the transceiver 420 transmits the adjustment voltage VA to the node ND. In one embodiment, the transceiver 420 includes a current limiter, which decreases the adjustment voltage VA when the transceiver 420 is turned off and provides the decreased adjustment voltage to the node ND.

When the controller 416 determines that the adapter 424 has been inserted into the power socket 422, the controller 416 activates or deactivates the voltage regulator 418 and turns on or off at least one of the transceivers 406, 408, and 420 according to the connection states of the connectors 402 and 404 and the capabilities of the host 401 and the peripheral device 403. For example, the controller 416 may activate the voltage regulator 418 and provides the adjustment voltage VA to at least one of the host 401 and the peripheral device 403 via the transceivers 406, 408, and 420.

FIG. 4B is a schematic diagram of an exemplary embodiment of operation modes of the bridge device 400 shown in FIG. 4A, according to various aspects of the present disclosure. As shown in FIG. 4B, the bridge device 400 may operate in modes M41~M49. The modes M41~M44 are the same as the modes M21~M24 shown in FIG. 2B, respectively. Therefore, the descriptions of the modes M41~M44 are omitted. Additionally, when the bridge device 400 operates in the modes M41~M44, the controller 416 deactivates the voltage regulator 418 and turns off the transceiver 420.

When the host 401 and the adapter 424 are coupled to the bridge device 400, the bridge device 400 operates in the mode M45. In this mode, the controller 416 activates the voltage regulator 418 and turns on the transceivers 406 and 420. The voltage regulator 418 transforms the external power VDC provided by the adapter 424 and provides the adjustment voltage VA to the host 401 and the node ND via the transceivers 420 and 406. In the mode M45, the adapter 424 provides power to the bridge device 400 and the host 401. At this time, since the peripheral device 403 does not couple to the connector 404, the controller 416 turns off the transceiver 408.

When the host 401, the peripheral device 403 and the adapter 424 are coupled to the bridge device 400, the bridge device 400 operates in one of the modes M46~M49 according to the capabilities of the host 401, the peripheral device 403 and the adapter 424. For example, when the energy required by the host 401 is higher than the energy provided by the peripheral device 403, the bridge device 400 operates in the mode M46. In this mode, the controller 416 activates the voltage regulator 418 and turns on the transceivers 406, 408, and 420. At this time, both the peripheral device 403 and the adapter 424 provide power to the host 401 and the bridge device 400. In other words, the controller 416 provides the charge power VCH provided by the peripheral device 403 and the adjustment voltage VA provided by the adapter 424 to the host 401 and the node ND.

Furthermore, when the peripheral device 403 is not a charger, the bridge device 400 may operate in the mode M47 or M48. In the mode M47, the controller 416 activates the voltage regulator 418 and turns on the transceivers 408 and 420. Therefore, the adapter 424 provides power to the bridge device 400 and the peripheral device 403. In other words, the controller 416 generates the control signal SC and turns on the transceivers 408 and 420 to transmit the adjustment voltage VA to the node ND and the peripheral device 403. In another embodiment, in the mode M48, the controller 416 activates the voltage regulator 418 and turns on the transceivers 406, 408, and 420. Therefore, the adapter 424 provides power to the host 401, the bridge device 400, and the peripheral device 403. In other words, the controller 416 utilizes the transceivers 406, 408, and 420 to transmit the adjustment voltage VA to the host 401, the peripheral device 403, and the node ND. In other embodiments, when the peripheral device 403 needs more power energy, the bridge device 400 operates in the mode M49. In this mode, the controller 416 activates the voltage regulator 418 and turns on the transceivers 406, 408, and 420. At this time, both the host 401 and the adapter 424 provide power to the bridge device 400 and the peripheral device 403. In other words, the controller 416 utilizes the transceivers 406, 408, and 420 to provide the adjustment voltage VA and the host power VHT provided by the host 401 to the node ND and the peripheral device 403.

Figure 5:
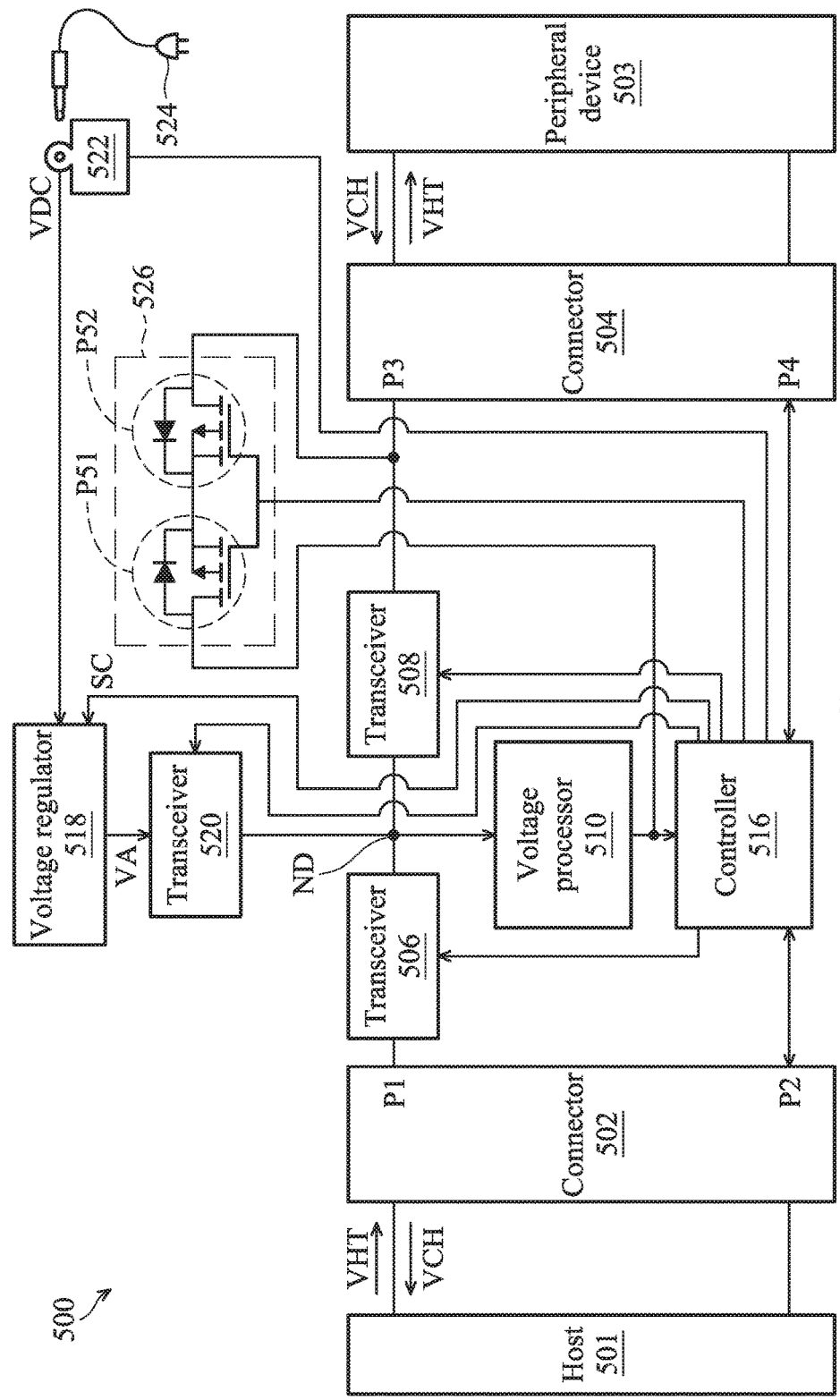
FIG. 5 is a schematic diagram of another exemplary embodiment of the bridge device, according to various aspects of the present disclosure.

FIG. 5 is a schematic diagram of another exemplary embodiment of the bridge device, according to various aspects of the present disclosure. FIG. 5 is similar to FIG. 4A with the exception that the bridge device 500 shown in FIG. 5 further includes a transceiver 526. The operation of the transceiver 506 shown in FIG. 5 is the same as the operation of the transceiver 406 shown in FIG. 4A. The operation of the transceiver 508 shown in FIG. 5 is the same as the operation of the transceiver 408 shown in FIG. 4A. The operation of the transceiver 520 shown in FIG. 5 is the same as the operation of the transceiver 420 shown in FIG. 4A. The operation of the voltage processor 510 shown in FIG. 5 is the same as the operation of the voltage processor 410 shown in FIG. 4A The operation of the connector 502 shown in FIG. 5 is the same as the operation of the connector 402 shown in FIG. 4A. The operation of the connector 504 shown in FIG. 5 is the same as the operation of the connector 404 shown in FIG. 4A. The operation of the voltage regulator 518 shown in FIG. 5 is the same as the operation of the voltage regulator 418 shown in FIG. 4A. The operation of the power socket 522 shown in FIG. 5 is the same as the operation of the power socket 422 shown in FIG. 4A. The operation of the adapter 524 shown in FIG. 5 is the same as the operation of the adapter 424 shown in FIG. 4A. Therefore, the descriptions of the transceivers 506, 508, and 520, the voltage processor 510, the connectors 502 and 504, the voltage regulator 518, the power socket 522, and the adapter 524 are omitted.

The transceiver 526 is coupled between the controller 516 and the pin P3. When the energy provided by peripheral device 503 is equivalent to the energy required by the controller 516, the controller 516 turns on the transceiver 526 to directly receive the charge energy provided by the peripheral device 503 (i.e. transmitting the voltage of the pin P3 to the controller 516). However, when the energy provided by the peripheral device 503 is too great, the controller 516 turns off the transceiver 526 to avoid too much energy entering the controller 516.

In one embodiment, the transceiver 526 includes P-type transistors P51 and P52, but the disclosure is not limited thereto. In other embodiments, the transceiver 526 includes more transistors or fewer transistors. Additionally, the transceiver 526 may include at least one N-type transistor. In this embodiment, the P-type transistor P51 is connected to the P-type transistor P52 in series between the controller 516 and the pin P3. The gates of the P-type transistors P51 and P52 are coupled to the controller 516.

Figure 6A:
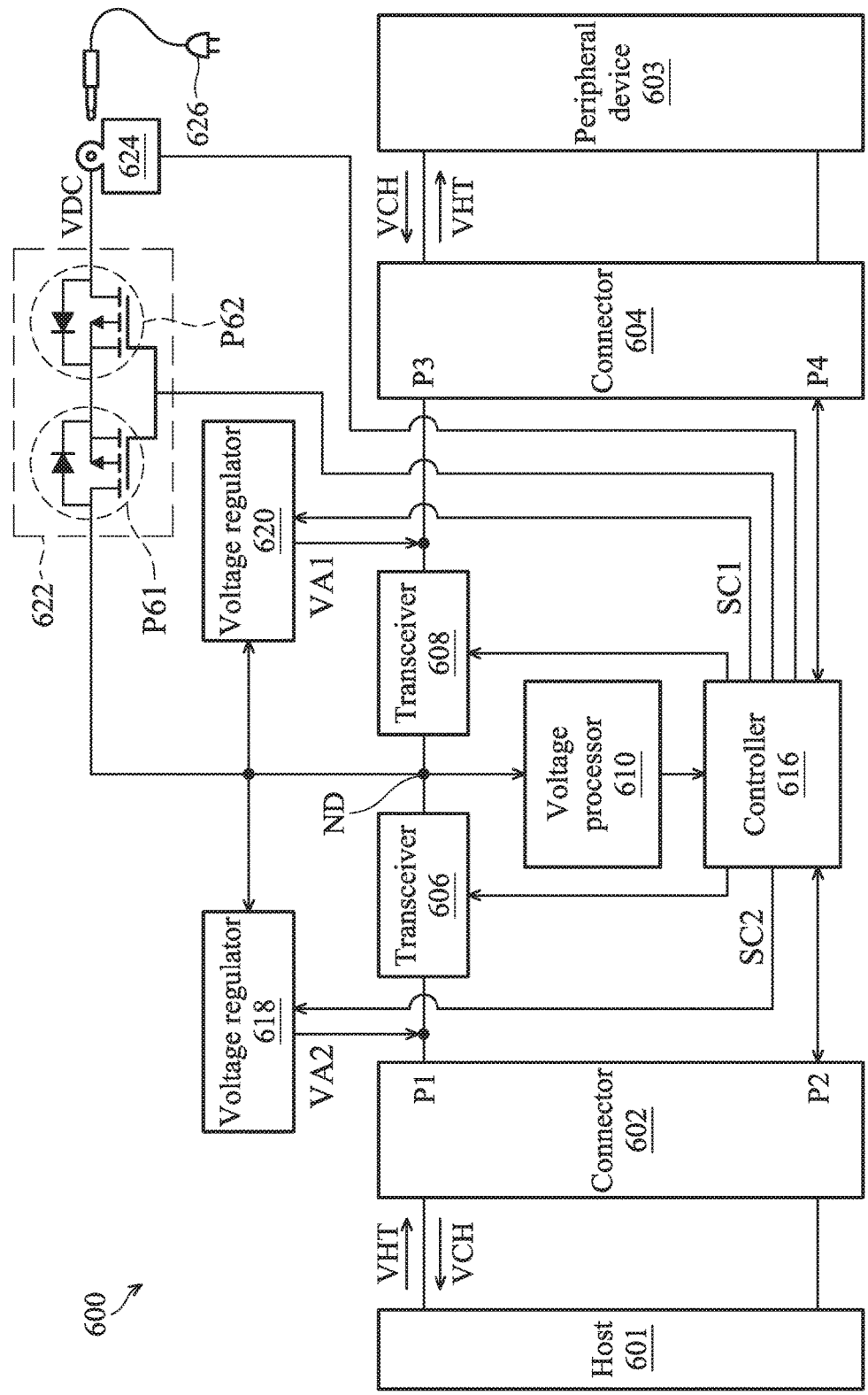
FIG. 6A is a schematic diagram of another exemplary embodiment of the bridge device, according to various aspects of the present disclosure.

FIG. 6A is a schematic diagram of another exemplary embodiment of the bridge device, according to various aspects of the present disclosure. FIG. 6A is similar to FIG. 2A with the exception that the bridge device 600 shown in FIG. 6A further includes voltage regulators 618 and 620, a transceiver 622, and a power socket 624. The operation of the connector 602 shown in FIG. 6A is the same as the operation of the connector 202 shown in FIG. 2A. The operation of the connector 604 shown in FIG. 6A is the same as the operation of the connector 204 shown in FIG. 2A. The operation of the transceiver 606 shown in FIG. 6A is the same as the operation of the transceiver 206 shown in FIG. 2A. The operation of the transceiver 608 shown in FIG. 6A is the same as the operation of the transceiver 208 shown in FIG. 2A. The operation of the voltage processor 610 shown in FIG. 6A is the same as the operation of the voltage processor 210 shown in FIG. 2A. Therefore, the descriptions of the connectors 602 and 604, the voltage processor 610, and the transceivers 606 and 608 are omitted.

The power socket 624 is configured to couple to an adapter 626. The adapter 626 provides external power VDC to the power socket 624. The transceiver 622 is coupled between the power socket 624 and the node ND to transmit the external power VDC to the node ND. In this embodiment, the transceiver 622 includes P-type transistors P61 and P62. The P-type transistor P61 is coupled to the P-type transistor P62 in series between the power socket 624 and the node ND. When the controller 616 turns on the P-type transistors P61 and P62, the P-type transistors P61 and P62 transmit the external power VDC to the node ND. In other embodiments, the transceiver 622 includes more transistors or fewer transistors or includes at least one N-type transistor.

The voltage regulator 620 is coupled between the pin P3 and the node ND and transforms the external power VDC according to a control signal SC1 to generate an adjustment voltage VA1 to the pin P3. The voltage regulator 618 is coupled between the pin P1 and the node ND and transforms the external power VDC according to a control signal SC2 to generate an adjustment voltage VA2 to the pin P1.

In this embodiment, the controller 616 controls the voltage regulators 618 and 620 and turns on at least one of the transceivers 606, 608, and 622 according to the connection states of the connectors 602 and 604, the connection state of the power socket 624, and the capabilities of the host 601, the peripheral device 603, and the adapter 626.

FIG. 6B is a schematic diagram of an exemplary embodiment of operation modes of the bridge device 600 shown in FIG. 6A, according to various aspects of the present disclosure. As shown in FIG. 6B, the bridge device 600 may operate in modes M61~M71. The modes M61~M64 are the same as the modes M21~M24 of FIG. 2B, respectively. Therefore, the descriptions of the modes M61~M64 are omitted. Additionally, when the bridge device 600 operates in the modes M61~M64, the controller 616 deactivates the voltage regulators 618 and 620 and turns off the transceiver 622.

When the host 601 and the adapter 626 are coupled to the bridge device 600, the bridge device 600 operates in the mode M65 or M66 according to the capabilities of the host 601 and the adapter 626. When the energy provided by the adapter 626 is equal to the energy required by the host 601, the controller 616 turns on the transceivers 606 and 622 to directly provide external power VDC to the host 601. In the anode M65, the adapter 626 provides power to the bridge device 600. However, when the energy provided by the adapter 626 is greater than or than the energy required by the host 601, the controller 616 operates in the mode M66. In this mode, the controller 616 turns on the transceiver 622 and activates the voltage regulator 618. Therefore, the voltage regulator 618 transforms the external power VDC into the adjustment voltage VA2 required by the host 601 and provides the adjustment voltage VA2 to the host 601. At this time, the adapter 626 provides power to the bridge device 600. Additionally, in the mode M66, the controller 616 turns off the transceiver 606 and 608 and deactivates the voltage regulator 620.

When the host 601, the peripheral device 603, and the adapter 626 are coupled to the bridge device 600, the controller 616 operates in one of modes M67~M71 according to the capabilities of the host 601, the peripheral device 603 and the adapter 626. In one embodiment, when the host 601 needs great charge energy and the peripheral device 603 is a charger, the bridge device 600 operates in the mode M67. In this mode, the controller 616 turns on the transceivers 606, 608, and 622 and deactivates the voltage regulators 618 and 620. At this time, both the peripheral device 603 and the adapter 626 provide power to the host 601 and the bridge device 600. If the peripheral device 603 is not a charger, the bridge device 600 operates in the mode M68. In this mode, the controller 616 turns on the transceivers 606, 608, and 622 and deactivates the voltage regulators 618 and 620. At this the adapter 626 provides power to the host 601, the peripheral device 603 and the bridge device 600.

When the host 601, the peripheral device 603 and the adapter 626 are coupled to the bridge device 600, if the energy provided by the adapter 626 does not match the energy required by the host 601 and the peripheral device 603, the bridge device 600 operates in the mode M69. In this mode, the controller 616 turns on the transceiver 622 and activates the voltage regulators 618 and 620. The voltage regulator 618 transforms the external power VDC provided by the adapter 626 into the adjustment voltage VA2 required by the host 601 and provides the adjustment voltage VA2 to the host 601. Similarly, the voltage regulator 620 transforms the external power VDC provided by the adapter 626 into the adjustment voltage VA1 required by the peripheral device 603 and provides the adjustment voltage VA1 to the peripheral device 603. In the mode M69, the controller 616 turns off the transceivers 606 and 608 and receives the external power VDC provided by the adapter 626.

When the peripheral device 603 is not a charger, if the energy provided by the peripheral device 603 is not equal to the energy provided by the adapter 626, the bridge device 600 operates in the mode M70. In this mode, the controller 616 turns on the transceiver 622 and activates the voltage regulator 620. The voltage regulator 620 transforms the energy provided by the adapter 626 into an adjustment voltage VA1 and provides the adjustment voltage VA1 to the peripheral device 603 via the pin P3. At this time, the adapter 626 provides power to the bridge device 600.

When the energy provided by the adapter 626 matches the energy required by the host 601 but does not match the energy required by the peripheral device 603, the bridge device 600 operates in the mode M71. In this mode, the controller 616 turns on the transceivers 606 and 622 and activates the voltage regulator 620. At this time, the transceiver 606 provides the energy provided by the adapter 626 to the host 601. The voltage regulator 620 transforms the energy provided by the adapter 626 into an adjustment voltage VA1 and provides the adjustment voltage VA1 to the peripheral device 603 via the pin P3. At this time, the adapter 626 provides power to the bridge device 600.

The bridge device 600 may operate in one of the modes M61~M71, however, this is not a limitation to the present invention. In other embodiments, the bridge device 600 appropriately turns on at least one of the transceivers 606, 608, and 622 according to the connection states of the connectors 602 and 604, the connection state of the power socket 624, and the capabilities of the host 601, the peripheral device 603, and the adapter 626. The bridge device 600 may appropriately activate at least one of the voltage regulators 618 and 620 to transform the energy provided by the adapter 626.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A bridge device, comprising:
a first connector configured to couple to a host and comprising a first pin;
a first transceiver coupled between the first pin and a node and comprising a first current limiter;
a second connector configured to couple to a peripheral device and comprising a second pin;
a second transceiver coupled between the node and the second pin and comprising a second current limiter;
a voltage processor adjusting a voltage of the node to generate an operation voltage; and
a controller receiving the operation voltage to determine whether to turn on at least one of the first and second transceivers,
wherein:
responsive to the host being coupled to the first connector and the controller not turning on the first transceiver, the first current limiter decreases host power provided by the host, and
responsive to the controller turning on first transceiver, the first current limiter does not decrease the host power.

2. The bridge device as claimed in claim 1, wherein when the host is coupled to the first connector and the peripheral device is coupled to the second connector, the controller turns on the first and second transceivers.

3. The bridge device as claimed in claim 1, wherein when the host provides a host power to the first pin, the first current limiter processes the host power to generate a first output voltage to the node, and the controller turns on the first transceiver to transmit the host power to the node.

4. The bridge device as claimed in claim 1, wherein when the peripheral device provides charge power to the second pin, the second current limiter processes the charge power to generate a second output voltage to the node, and the controller turns on the second transceiver to transmit the charge power to the node.

5. The bridge device as claimed in claim 4, further comprising:
a voltage regulator transforming a level of the second pin according to a control signal to generate an adjustment voltage; and
a third transceiver coupled between the first pin and the voltage regulator, wherein the controller generates the control signal to activate the voltage regulator and turn on the third transceiver to provide the adjustment voltage to the first pin.

6. The bridge device as claimed in claim 5, wherein the controller turns off the first transceiver and turns on the second transceiver to transmit the charge power to the node.

7. The bridge device as claimed in claim 5, wherein the controller generates the control signal according to an inter-integrated circuit (I2C) protocol.

8. The bridge device as claimed in claim 1, further comprising:
a power socket configured to receive external power;
a voltage regulator transforming the external power according to a control signal to generate an adjustment voltage; and
a third transceiver coupled between the node and the voltage regulator to transmit the adjustment voltage to the first pin and the node.

9. The bridge device as claimed in claim 8, wherein the controller turns on the second transceiver to transmit charge power provided by the peripheral device to the first pin and the node.

10. The bridge device as claimed in claim 8, wherein the controller activates the voltage regulator and turns on the second and third transceivers to provide the adjustment voltage to the second pin and the node.

11. The bridge device as claimed in claim 8, wherein the controller activates the voltage regulator and turns on the first, second, and third transceivers to provide the adjustment voltage to the first and second pins and the node.

12. The bridge device as claimed in claim 8, wherein the controller activates the voltage regulator and turns on the first, second, and third transceivers to provide the adjustment voltage and a host power provided by the host to the second pin and the node.

13. The bridge device as claimed in claim 8, further comprising:
a fourth transceiver coupled between the controller and the second pin, wherein the controller turns off the second transceiver and turns on the fourth transceiver to transmit a voltage of the second pin to the controller.

14. The bridge device as claimed in claim 1, further comprising:
a power socket configured to receive external power;
a third transceiver coupled between the power socket and the node;
a first voltage regulator coupled between the second pin and the node and transforming the external power according to a first control signal to generate a first adjustment voltage to the second pin; and
a second voltage regulator coupled between the first pin and the node and transforming the external power according to a second control signal to generate a second adjustment voltage to the first pin.

15. The bridge device as claimed in claim 14, wherein the controller turns on the first and third transceivers to transmit the external power to the first pin and the node.

16. The bridge device as claimed in claim 14, wherein the controller turns on the third transceiver and activates the second voltage regulator to provide the second adjustment voltage to the first pin.

17. The bridge device as claimed in claim 14, wherein when the peripheral device provides charge power, the controller turns on the first, second, and third transceivers to transmit the external power and the charge power to the first pin and the node.

18. The bridge device as claimed in claim 14, wherein the controller turns on the first, second, and third transceivers to transmit the external power to the first and second pins and the node.

19. The bridge device as claimed in claim 14, wherein the controller turns on the third transceiver and activates the first and second voltage regulators to transmit the first adjustment voltage to the second pin and transmit the second adjustment voltage to the first pin.

20. The bridge device as claimed in claim 14, wherein the controller turns on the third transceiver and activates the first voltage regulator to transmit the first adjustment voltage to the second pin.

21. The bridge device as claimed in claim 14, wherein the controller turns on the first and third transceivers and activates the first voltage regulator to transmit the external power to the first pin and transmit the first adjustment voltage to the second pin.

22. The bridge device as claimed in claim 1, wherein the voltage processor comprises:
a boost circuit increasing the level of the node to generate an output voltage; and
a buck circuit reducing the output voltage to generate the operation voltage.

23. The bridge device as claimed in claim 1, further comprising:
a third connector configured to couple to a display device, wherein the controller utilizes the third connector to provide an image signal provided by the host to the display device.

24. The bridge device as claimed in claim 1, wherein each of the first and second connectors is a USB Type-C connector.

* * * * *